J. GUEHRING.
MALT TURNING, AERATING, AND GATHERING MACHINE.
APPLICATION FILED APR. 15, 1912.

1,063,872.

Patented June 3, 1913.

6 SHEETS—SHEET 2.

J. GUEHRING.
MALT TURNING, AERATING, AND GATHERING MACHINE.
APPLICATION FILED APR. 15, 1912.

1,063,872.

Patented June 3, 1913.
6 SHEETS—SHEET 4.

Witnesses
Arthur White
Harold Lambert

Inventor
John Guehring.

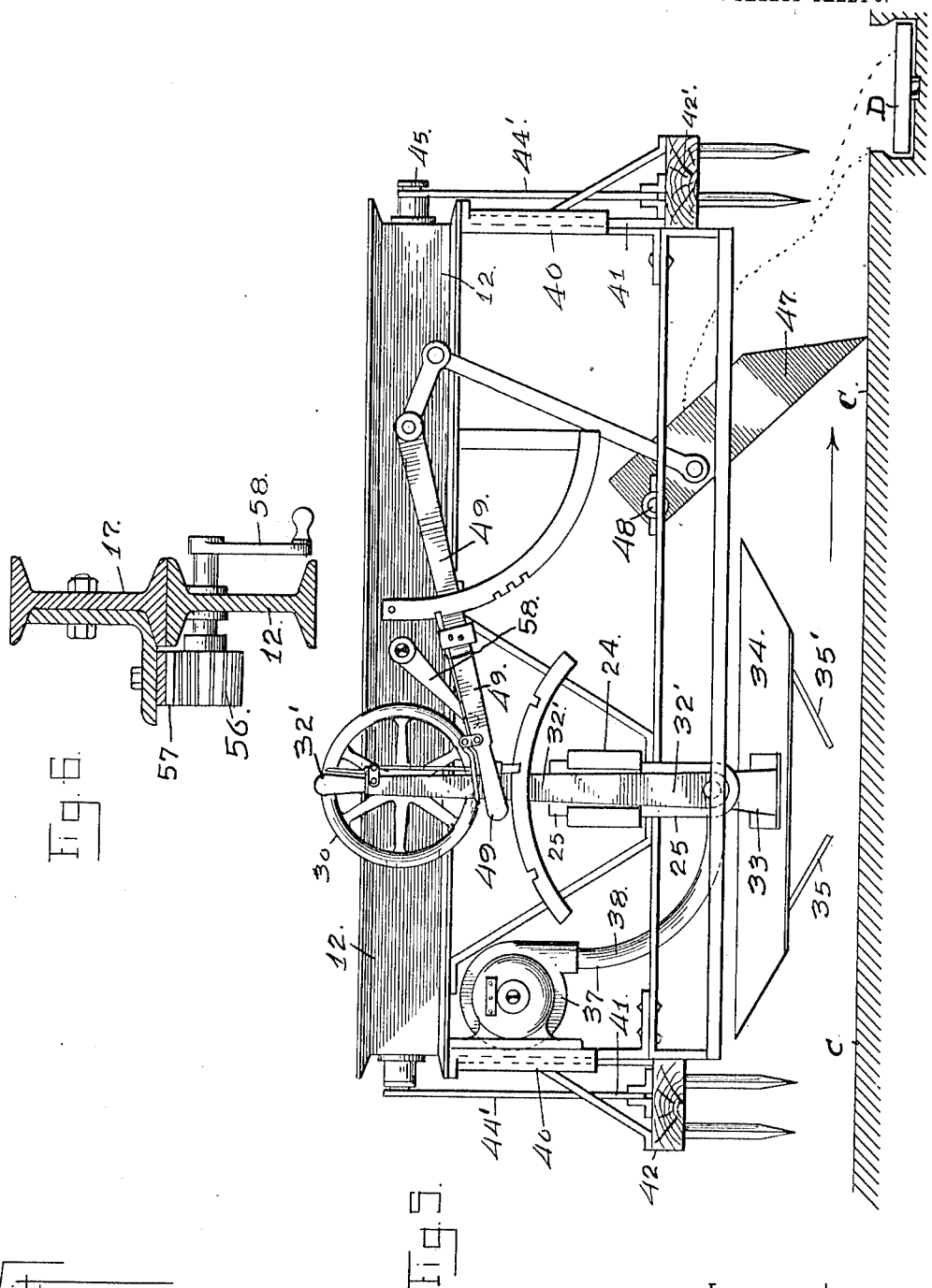

J. GUEHRING.
MALT TURNING, AERATING, AND GATHERING MACHINE.
APPLICATION FILED APR. 15, 1912.
1,063,872.
Patented June 3, 1913.
6 SHEETS—SHEET 6.
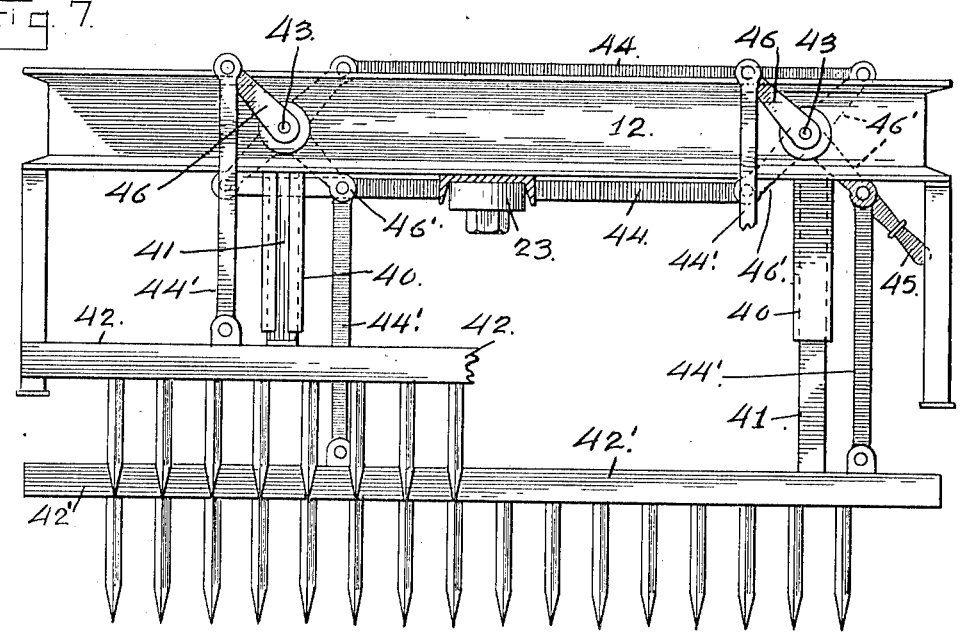
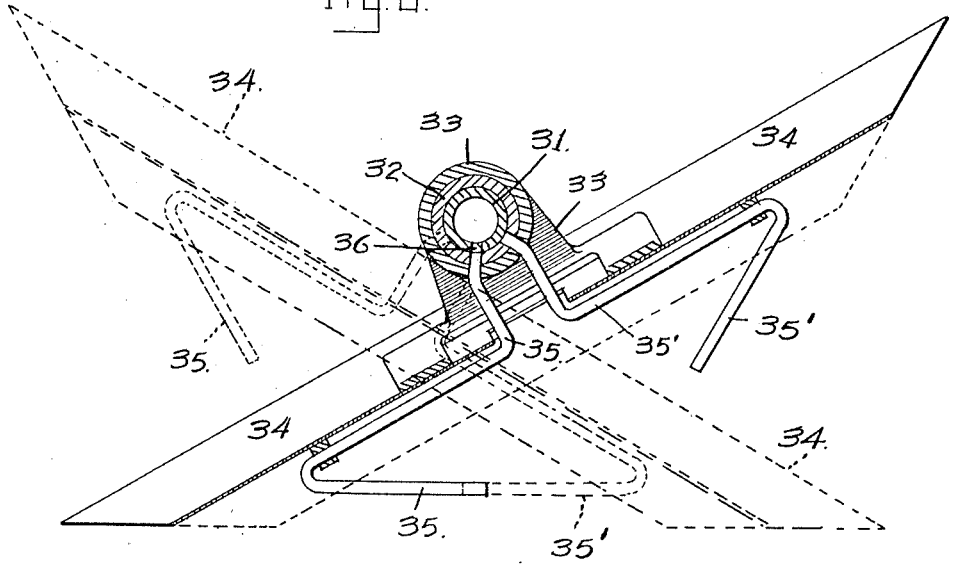

UNITED STATES PATENT OFFICE.

JOHN GUEHRING, OF SAN FRANCISCO, CALIFORNIA.

MALT TURNING, AERATING, AND GATHERING MACHINE.

1,063,872.  Specification of Letters Patent.  Patented June 3, 1913.

Application filed April 15, 1912.  Serial No. 691,030.

*To all whom it may concern:*

Be it known that I, JOHN GUEHRING, a citizen of the United States, residing in the city and county of San Francisco and State of California, have invented a new and useful Malt Turning, Aerating, and Gathering Machine, of which the following is a specification.

My invention relates to improvements in malt turning, aerating and gathering machines in which horizontally pivoted reversible plow blades operate in conjunction with blow pipes and rakes; and the objects of my improvement are, first, to provide means for separating the entwined masses of sprouting malt; second, to aerate the said malt; third, to level the layer of malt by means of the rakes; and, fourth, to provide means for gathering and conveying the sprouted malt to a conveyer or other contrivance by which means it is conveyed to the drying kilns. I attain these several objects by the mechanism shown in the accompanying drawings, in which—

Figure 1:
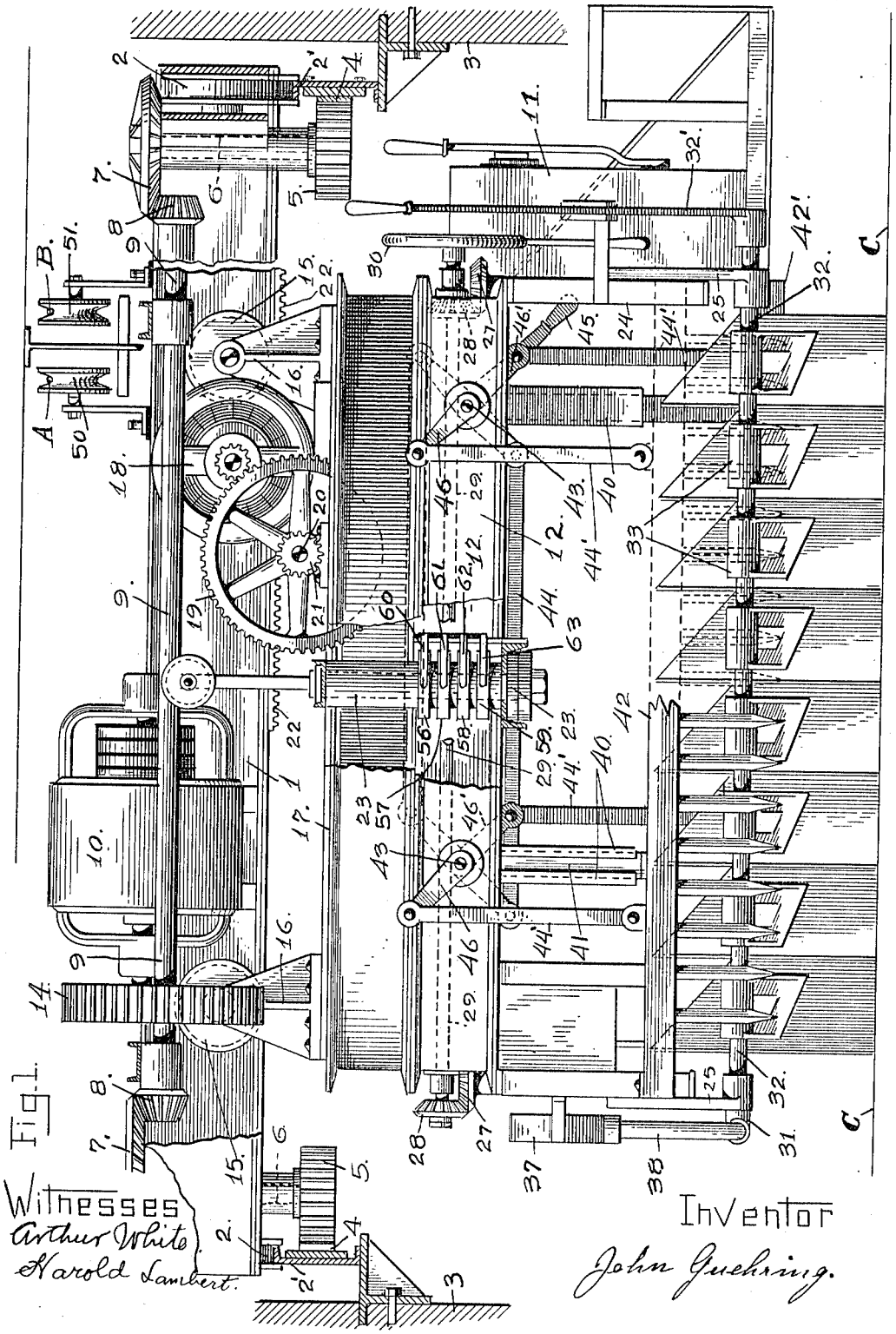
Figure 2:
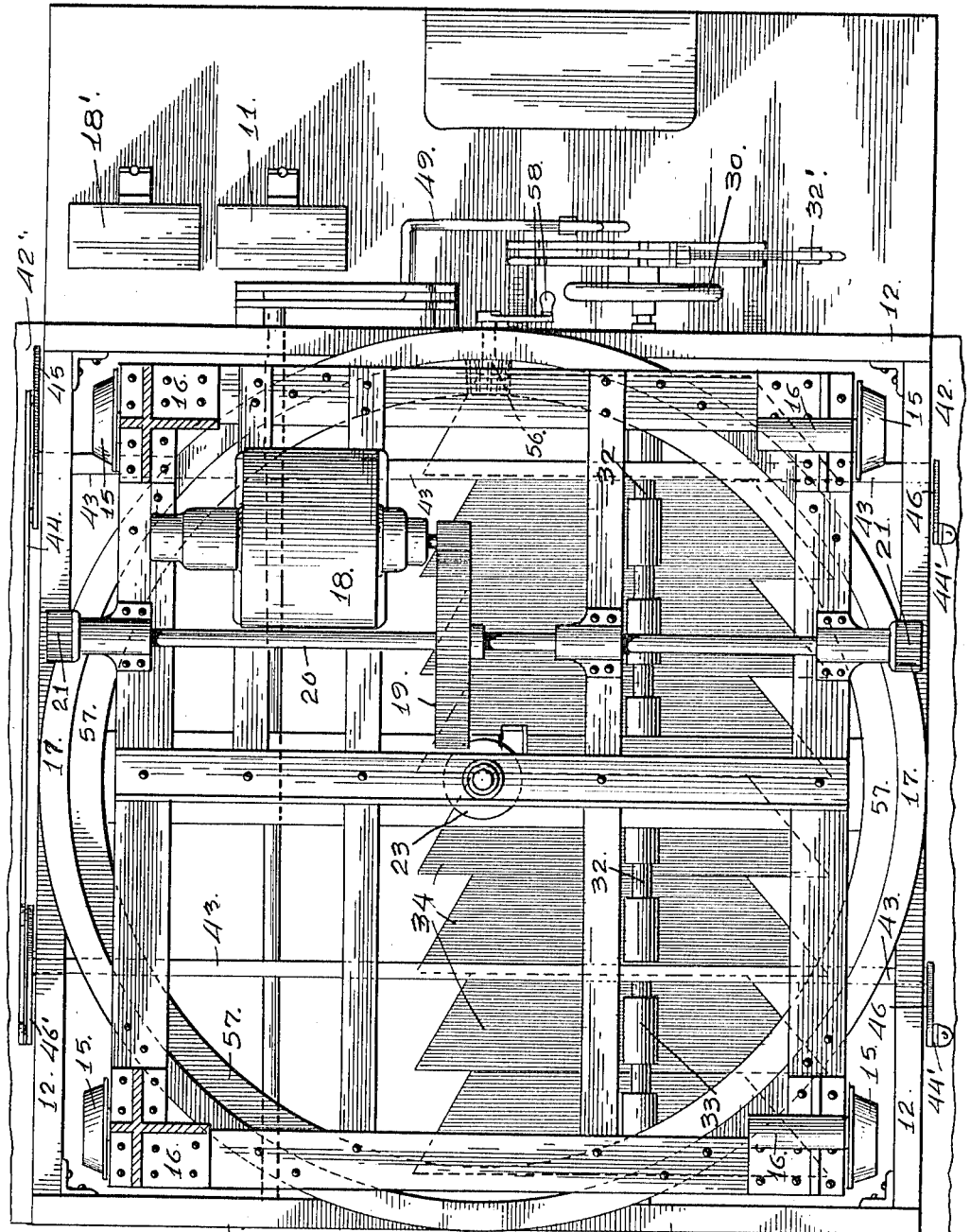
Figure 3:
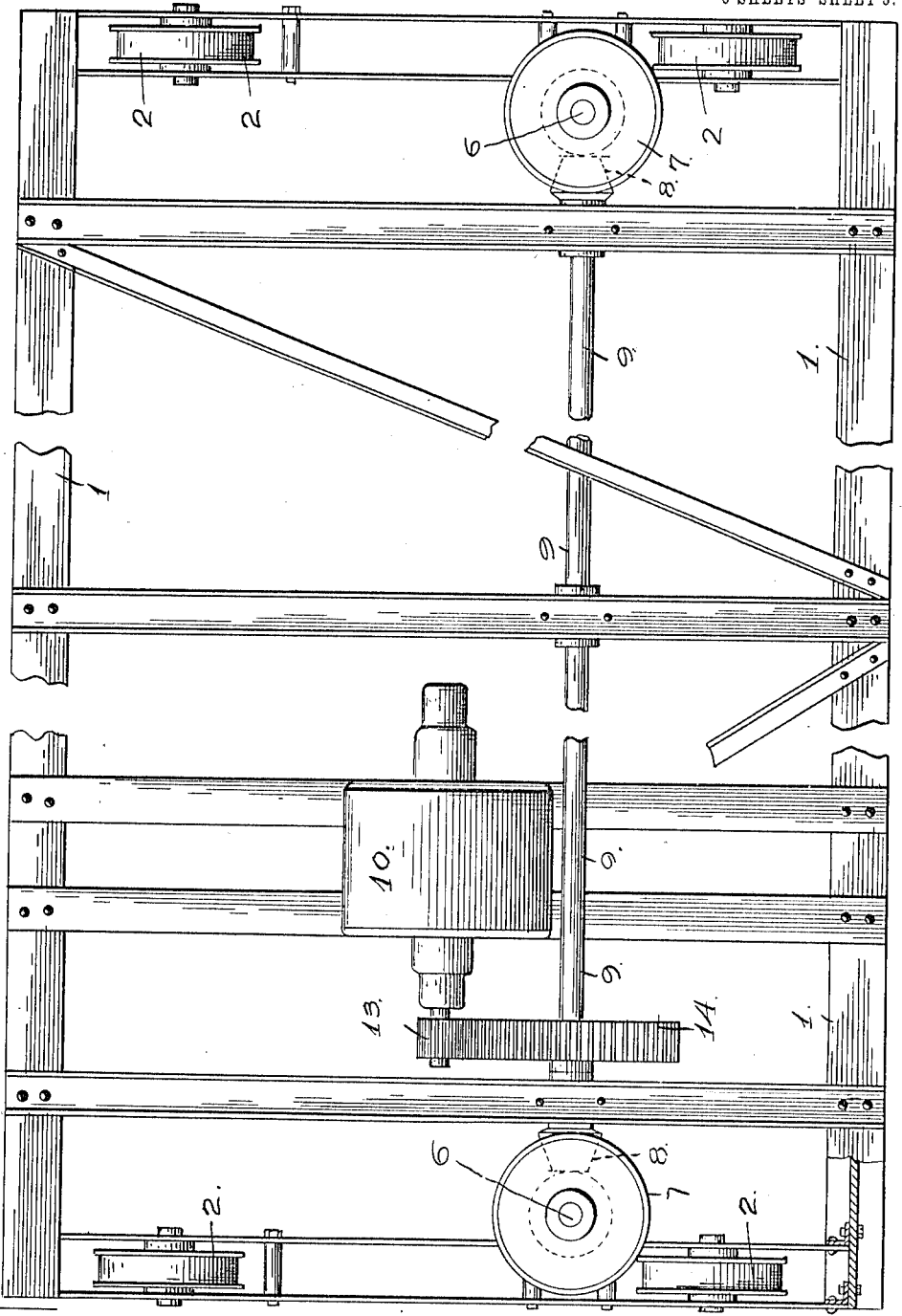
Figure 4:
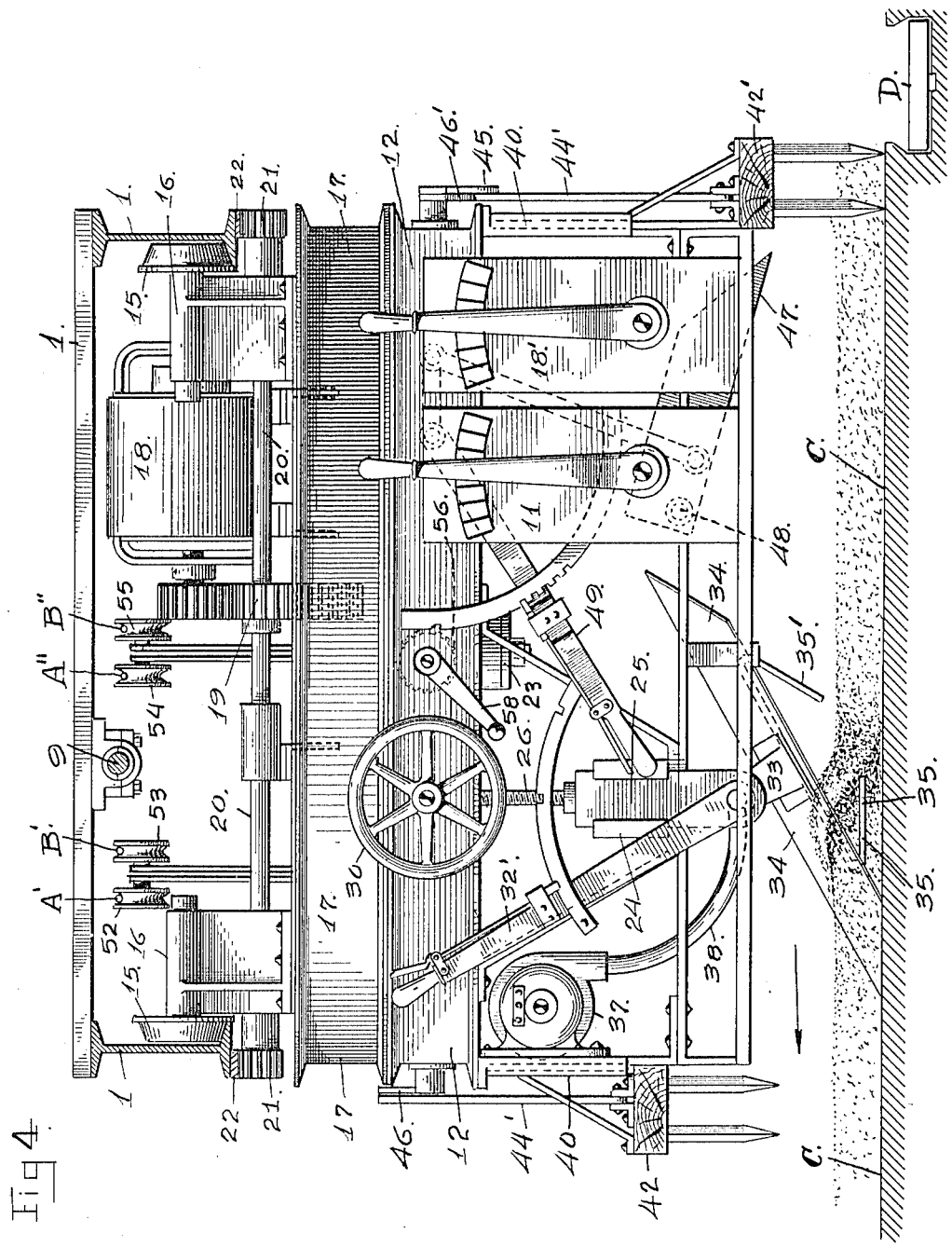

Figure 1 is a side elevation of my invention partly broken in order to disclose the driving mechanism and the electric collectors and collector rings. Fig. 2 is a plan view of the suspended and rotatable carriages removed from the traveling crane. Fig. 3 is a broken plan view of the traveling crane. Fig. 4 is a transverse section through the traveling crane showing a side elevation of the suspended and rotatable carriages and the action of the plows, also the manner of turning the sprouting malt over and upon the aerating pipes. Fig. 5 is a view of the lower portion of the rotatable carriage with the controllers removed showing the plows and rakes in a neutral position and the collecting or gathering scoop in operation. Fig. 6 is a sectional detailed view of the bevel pinion and gear for rotating the lower portion of the suspended carriage. Fig. 7 is a front elevation of the lower or rotatable portion of the suspended carriage showing the manner of connecting the rakes, and Fig. 8 is a vertical section taken through one of the plow blades showing the manner in which the aerating pipes are connected and disconnected with the fixed or stationary air pipe.

Before describing the operation of my invention, it is essential that the process of making malt be referred to in order that a clear comprehension may be had of the various features of the said invention. In making malt the grain is first thoroughly soaked in tanks of water, constructed for the purpose, for a period of about fifty hours, after which it is spread evenly, to a depth of from four to six inches, over the floor of a large water-tight tank or vat constructed of concrete or other suitable material, so that the moisture in the grain will be, to a proper extent, retained. After the grain begins to sprout the tendrils intertwine with each other and tend to form a tangled mass which is detrimental to the sprouting process as it tends to exclude the air. In order to aerate the grain thoroughly, so that the process of sprouting may be facilitated, the grain is turned over by means of hand paddles, separated and distributed. The sprouting of the grain is so rapid that the operation of turning and aerating must be repeated at intervals of about eight hours for a period of five days. After the grain has sprouted sufficiently, a large scraper, having a long rope connection to a revolving drum, must be dragged back and forth across the floor in order to gather the malt into an endless conveyer by which it is conveyed to the drying kilns. This hand work in connection with the manufacture of malt is unsatisfactory as it takes considerable time and the thoroughness with which the work is done depends entirely on the conscientiousness of the operator. It is also difficult to aerate the grain sufficiently by the hand process. Another disadvantage is the fact that the operators must walk over the grain while turning it. The shoes or boots of the operators crush a great many sprouting grains which kills the said grain and causes it to become moldy. This mold, if transmitted to adjacent grains, spreads very rapidly and must be eliminated before the malt can be used for brewing. In order to do this work thoroughly and rapidly without walking on the grain, and in order to introduce sufficient air into the sprouting grain to facilitate the process and prevent molding I have devised the machine which I shall now proceed to describe.

My invention consists mainly of a traveling crane provided with a suspended traveling carriage having a rotatable portion to which is secured a plurality of pivotally mounted, lever controlled plows, blow pipes for each plow blade for the introduction of air into the malt, rakes for leveling the separated grains and a lever controlled scoop to be used for gathering the grain or malt to any portion of the working floor.

The numeral 1 is used to designate a traveling crane having wheels 2 which run on tracks 2' secured to the walls 3 of the vat or any suitable structure. To the tracks 2' are secured the racks 4 which are engaged by pinions 5 on the lower ends of the shafts 6 rotatably mounted on the crane 1. Rigidly secured to the upper ends of the shafts 6 are the bevel gears 7 meshing with the bevel gears or pinions 8 on the shaft 9 which is rotatably mounted in suitable bearings on the crane 1. A motor 10, controlled by a controller 11 on the suspended carriage 12, drives the shaft 9 by means of the connecting or driving gears 13 and 14. Suspended by means of the flanged wheels 15, which ride on suitable tracks on the crane 1, and their bearings 16, is a circular carriage 17. Mounted thereon is a motor 18, controlled by a controller 18' on the carriage 12, which drives a gear 19 secured to a shaft 20 mounted in suitable bearings on the circular carriage 17. At both ends of the shaft 20 are pinions 21 which engage racks 22 secured to the crane 1 so that the said circular suspended carriage 17 may be readily moved the length of the crane 1 by means of the said gearing, pinions and toothed racks. Pivotally suspended from the carriage 17, by means of the ball bearing pivot 23, is a rotatable carriage 12. A suitable frame depending from the rotatable carriage 12 supports guide ways 24 through which bearing blocks or nuts 25 are raised or lowered by means of threaded stems 26 provided at their upper ends with bevel gears 27 adapted to be engaged and driven by similar gears 28 secured to a horizontal shaft 29 rotatably mounted on the carriage 12. The shaft 29 is rotated by means of the hand wheel 30. In the bearing blocks 25 is rotatably mounted a sleeve 32 to which is rigidly secured at one end the hand lever 32', and, at equal intervals, the castings 33 which carry the plow blades 34. A fixed air pipe 31, having apertures 36, is held within the sleeve 32. A set of V shaped aerating pipes 35 and 35' is secured to each of the castings 33, the fixed ends of the said pipes 35 and 35' being adapted to register, in one position, with the aperture 36 in the fixed pipe 31.

Referring to Fig. 8 of the drawings it will be seen that there is only one opening or aperture 36 for each set of pipes 35 and 35'. When the blades are in the position shown in full lines in Fig. 8, (and Fig. 4), the fixed ends of the pipes 35 register with the apertures 36 and no air can be admitted to the pipes 35' while the pipes 35 are in that position. When, however, the plow blades 34 are shifted to the position shown in dotted lines, Fig. 8 of the drawings, the air connection is disconnected from the pipes 35 and the ends of the pipes 35' register with the aperture 36 in the fixed pipe 31. The purpose of this arrangement will hereinafter be more fully described.

A blower 37 having a flexible connection 38 to one end of the pipe 31 supplies the air to the said pipe.

Suspended from the front and rear ends of the carriage 12 are vertical guides 40 in which are slidably mounted supports 41 of the rakes 42 and 42'. Horizontal shafts 43, rotatably secured to the carriage 12, are connected by means of links 44 and crank arms in such a manner that a quarter revolution imparted to one of the shafts 43, by the hand lever 45, will impart a similar movement to the other shaft. Diametrically opposed crank arms 46 and 46', secured to the opposite ends of each shaft 43, are connected to the rakes 42 and 42' by means of the links 44'. By this arrangement whenever the hand lever 45 is moved up or down it raises one of the rakes and lowers the other. The purpose of this arrangement will hereinafter be more fully set forth.

A scoop 47, pivotally secured to the frame of the carriage 12, is raised or lowered by means of the hand lever 49.

A bevel pinion 56, pivotally or rotatably mounted on the rotatable carriage 12, engages an annular bevel gear 57 secured to the lower or circular portion of the carriage 17. A handle 58 is provided to rotate the pinion 56 so that the rotatable carriage 12 may be rotated on the ball bearing pivot 23.

C is the floor over which the grain is distributed and D represents an endless conveyer for conveying the grain from the floor to the drying kilns.

Electrical connection is made to the machine for the operation of the motors in the following manner: The feed and return wires A and B, respectively, are suspended above the crane 1 in any suitable manner and are electrically connected to the feed wires A' and A'' and the return wires B' and B'', which are secured to and are carried by the crane 1, through the medium of the trolleys 50 and 51 and suitable wires connecting the said trolleys with the wires A', A'', B' and B''. A second set of trolleys 52, 53, 54 and 55 are secured to and carried by the carriage 17, and have suitable electrical connection with four collector rings 56, 57, 58 and 59 which are secured to and concentric with the ball bearing pivot 23. These collector rings are insulated from the bearing to which they are attached and also from each other. A series of spring collectors 60, 61, 62 and 63 are secured to a frame member of the carriage 12 and have frictional contact with the collector rings which travel with the carriage 17. These spring collectors are also insulated from each other and from the frame member to which they are attached. Proper electrical connections, not shown, are had between the spring collectors 60 and 61, and the controller 18', and similar connections are had between the collectors 62 and 63 and the controller 11.

The electrical connections for the motor 18 are made in the following manner: From the feed wire A, through the trolley 50, and insulated connection not shown, to the feed wire A'. From the wire A' by means of the trolley 52, collector ring 56, spring collector 60, insulated connection to the controller 18', insulated connection to spring collector 61, collector ring 57, motor 18, trolley 53, return wire B', insulated connection to trolley 51 and the return wire B.

The connections for the motor 10 are, wire A, trolley 50 to wire A'', trolley 54 to collector ring 58, spring collector 62 to controller 11, back to spring collector 63, collector ring 59, trolley 55, return wire B'' to the motor 10 and from the motor 10 to the trolley 51 and the return wire B.

The fan may be driven by means of a belt from some of the revolving shafts of the machine or by a separate motor, properly connected and controlled by similar means used for the control of the motors.

I will now proceed to describe the operation of the machine.

The grain having been soaked the proper length of time and spread over the floor C, the machine is started from any corner of the floor C by causing the crane 1 to travel the length of the said floor and back again. At the end of each trip of the crane 1, the carriage 17 is moved over on the crane 1 a distance equal to the width of the path made by the plow blades. The plow blades 34 are reversed, also the rakes 42 and 42' and the crane is started back again by reversing the direction of rotation of the motor 10, which drives the said crane. After the entire width of the floor has been worked in this manner, the carriage 12 is caused to turn through an arc of 90 degrees on its bearing 23. This brings the plow blades 34 in a position at right angles or transversely to their former position and, by causing the motor 18 to drive the carriage 17 back and forth the length of the crane 1, the layer of malt is cross-furrowed. This of course, tends to further separate and aerate the grain as the malt can be cross-furrowed as often as desired. In turning the carriage 12 through an arc of 90 degrees the same is accomplished by means of the pinion 56, turned by the handle 58, engaging the annular bevel gear 57 which is secured to the carriage 17. The plow blades 34 having been set as in the position shown in Fig. 4, by means of the hand lever 32' the air connections are, simultaneously, set as shown in Fig. 8 of the drawings. The machine traveling in the direction of the arrow, (Fig. 4), the plow blades 34 enter the layer of sprouting grain and turn the furrows over and onto the aerating pipes 35, each plow blade 34 turning a furrow over and onto the blow pipes which are under the adjacent blade. This partially separates and aerates the grain, the rakes 42', parallel with and following the plow blades 34, tend to further separate and level the grain. When the machine reaches the end of its path or the end of one furrow, the plow blades 34 are shifted by means of the hand lever 32' to the position shown in dotted lines in Fig. 8 of the drawings. This action moves the pipes 35 away from the opening 36 in the pipe 31 and causes the pipes 35' to register therewith. The rakes 42 and 42' are also reversed so that the rake 42' is withdrawn from the malt and the rakes 42, which now follow the plow blades 34, engage the same. The machine is now ready for its return trip.

It is obvious, from this arrangement, that when the plow blades are turning over the malt, the air connections are such that the air is delivered into and under the furrow, or, in other words, the furrows of sprouting grain are turned directly onto the supply of air. This insures the air reaching nearly every portion of the overturned furrow. Also, the air being disconnected from the pipe which is over the grain, there is no lessening of the amount of air delivered under the furrow. The bearing blocks 25, being vertically adjustable in the guide ways 24, permit the raising and lowering of the said plow blades 34 so that the same may be held at any angle or depth in relation to the layer of malt, or may be raised clear of the same when the gathering scoop is in operation. The rakes 42 and 42' are raised and lowered by means of the hereinbefore described mechanism so that when the operator has reached the end of the furrow and wishes to set the blades and rakes in position for the return trip, he may do so without having too many levers to handle. One operation of the handle or lever 45 will lower one rake and raise the other. A further advantage of this arrangement is that the operator can not lower one rake without raising the other. After the malt is ready for the drying kilns the rakes and plow blades are held clear of the malt by placing the hand levers that control the same in mid-position as shown in Fig. 5 of the drawings, and the scoop 47, pivoted as at 48, is lowered by the hand lever 49 until the edge of the said scoop 47 rests on the floor C. The machine is started from that portion of the floor C farthest from the conveyer D and the scoop engages and gathers the grain into the said conveyer which conveys the grain to the drying kilns. It is a further feature of this machine that the grain is not trampled on or bruised as in working the grain by hand.

The details of construction being so susceptible to variation I do not wish to be understood as limiting myself to the precise method of construction shown herein but rather to avail myself of any modification that may fall properly within the scope of my invention.

Having thus described my invention what I claim as new and desire to secure by Letters Patent is—

1. In a malt turning and aerating machine, the combination of a traveling crane; a movable carriage suspended from the crane; a rotatable carriage pivotally secured to the movably suspended carriage; and means secured to the rotatable carriage for turning and aerating the malt.

2. In a malt turning and aerating machine, the combination of a traveling crane; a movable carriage suspended from the crane; a rotatable carriage pivotally secured to the movably suspended carriage; a plurality of plow blades pivotally secured to the rotatable carriage adapted to engage and turn a layer of malt directly under the machine; and means for introducing a blast of air under the layer of malt after it has been turned.

3. In a malt turning and aerating machine, the combination of a traveling crane; a movable carriage suspended from the crane; a rotatable carriage pivotally secured to the movably suspended carriage; a plurality of reversible plow blades horizontally pivoted to the rotatable carriage and adapted to engage and turn a layer of malt directly under the machine into furrows and means secured to the reversible plow blades for directing a blast of air under each furrow of malt after it has been turned by the said plow blades.

4. In a malt turning and aerating machine, the combination of a traveling crane; a movable carriage suspended from the crane; a rotatable carriage pivotally secured to the movably suspended carriage; a plurality of reversible plow blades horizontally pivoted to the rotatable carriage adapted to engage and turn a layer of malt directly under the machine into furrows; means secured to the reversible plow blades for introducing a blast of air under each furrow of malt after it has been turned; and a vertically adjustable rake secured to each end of the rotatable carriage.

5. In a malt turning and aerating machine, the combination of a traveling crane having suitable motor-driven gearing for propelling the crane and toothed racks secured to the said crane; a movable carriage suspended from the crane and having suitable motor-driven pinions adapted to engage the toothed racks secured to the crane; a rotatable carriage pivotally suspended from the movably suspended carriage; a plurality of double-ended reversible plow blades adapted to engage and turn a layer of malt beneath the machine and each plow blade having two or more V-shaped blow pipes, horizontally pivoted on the rotatable carriage; means secured to the rotatable carriage for controlling the motors on the crane and movably suspended carriage; and a vertically adjustable rake secured to each end of the said rotatably suspended carriage and parallel with the plow blades.

6. In a malt turning and aerating machine, the combination of a traveling crane having suitable motor-driven gearing adapted to propel the said crane and toothed racks rigidly secured to the under side of the crane; a movable carriage suspended from the crane and provided with suitable motor-driven pinions adapted to engage the toothed racks rigidly secured to the under side of the crane; a rotatable carriage pivotally suspended from the movably suspended carriage; a plurality of double-ended reversible plow blades horizontally pivoted to the rotatable carriage, each plow blade having two or more V-shaped blow pipes secured thereto and adapted to engage and turn a layer of malt directly under the machine; controllers secured to the rotatable carriage for controlling the motors on the crane and movably suspended carriage; vertically adjustable rakes secured to the rotatable carriage and adapted to counter-balance each other; means for moving one rake upward and the other downward simultaneously.

7. In a malt turning and aerating machine, the combination of a traveling crane having suitable motor-driven gearing adapted to propel the said crane and toothed racks rigidly secured to the under side of the crane; a movable carriage suspended from the crane having an annular bevel gear and suitable motor-driven pinions adapted to engage the toothed racks on the under side of the crane; a rotatable carriage pivotally suspended from the movably suspended carriage; electric controllers on the rotatable carriage for controlling the motors on the crane and suspended carriage; a pinion on the rotatable carriage adapted to engage the annular bevel gear secured to the movably suspended carriage; means for rotating the pinion on the rotatable carriage; a plurality of double-ended reversible plow blades each having two or more V-shaped blow pipes and mounted on a rotatable hollow shaft; a fixed pipe within the shaft having one aperture for each plow blade adapted to register with one of the blow pipes secured to the said plow blades; means for rotating the plow blades and blow pipes simultaneously;

a vertically adjustable rake secured at each end of the rotatable carriage and parallel with the plow blades; means for lowering one rake and raising the other simultaneously; and means for producing an air blast within the fixed pipe on which the hollow sleeve, that carries the plow blades and blow pipes, rotates.

8. In a malt turning, aerating and gathering machine, the combination of a traveling crane having suitable motor driven gearing adapted to propel the said crane and toothed racks rigidly secured to the under side of the crane; a movable carriage suspended from the crane and provided with suitable motor driven pinions adapted to engage the toothed racks rigidly secured to the under side of the crane; a rotatable carriage pivotally suspended from the movably suspended carriage; a plurality of double-ended reversible plow blades horizontally pivoted to the rotatable carriage, each plow blade having two or more V-shaped blow pipes secured thereto and adapted to engage and turn a layer of malt directly under the machine; controllers secured to the rotatable carriage for controlling the motors on the crane and movably suspended carriage; vertically adjustable rakes secured to the rotatable carriage and adapted to counterbalance each other; means for moving one rake upward and the other downward simultaneously; and a lever controlled scoop pivotally mounted on the rotatable carriage and adapted to engage and gather the layer of malt.

9. In a malt turning, aerating and gathering machine, the combination of a traveling crane having suitable motor driven gearing adapted to propel the said crane and toothed racks rigidly secured to the under side of the crane; a movable carriage suspended from the crane having an annular bevel gear and suitable motor driven pinions adapted to engage the toothed racks on the under side of the crane; a rotatable carriage pivotally suspended from the movably suspended carriage; electric controllers on the rotatable carriage for controlling the motors on the crane and suspended carriage; a pinion on the rotatable carriage adapted to engage the annular bevel gear secured to the movably suspended carriage; means for rotating the pinion on the rotatable carriage; a plurality of double ended reversible plow blades each having two or more V-shaped blow pipes and mounted on a rotatable hollow shaft; a fixed pipe within the shaft having one aperture for each plow blade adapted to register with one of the blow pipes secured to the said plow blades; means for rotating the plow blades and blow pipes simultaneously; a vertically adjustable rake secured at each end of the rotatable carriage and parallel with the plow blades; means for lowering one rake and raising the other simultaneously; a scoop pivotally secured to the rotatable carriage; means secured to the rotatable carriage for lowering and elevating the said scoop; and means for producing an air blast within the fixed pipe on which the hollow sleeve, that carries the plow blades and blow pipes, rotates.

In witness whereof I hereunto set my signature in the presence of two subscribing witnesses.

JOHN GUEHRING.

Witnesses:
JAMES F. McCUE,
ARTHUR WHITE.

Copies of this patent may be obtained for five cents each, by addressing the "Commissioner of Patents, Washington, D. C."